United States Patent Office.

JOHN B. READ, OF TUSCALOOSA, ALABAMA.

Letters Patent No. 94,131, dated August 24, 1869; antedated August 17, 1869.

IMPROVEMENT IN THE MANUFACTURE OF PAPER.

The Schedule referred to in these Letters Patent and making part of the same.

*To all whom it may concern:*

Be it known that I, JOHN B. READ, of the town and county of Tuscaloosa, and State of Alabama, have discovered the applicability of the stalks of the cotton-plant, (*Gossypium*,) including the fibrous, the ligneous portion, and the pith of the entire plant, to the manufacture of paper, *papier-maché*, &c., the whole plant to be broken up, boiled, and beaten together into paper-pulp, without any necessity of previous separation of parts.

The nature of my invention consists in so breaking up and grinding together the fibrous, the ligneous portion, and the pith of the entire cotton-plant (*Gossypium*) as to furnish a uniform mass, readily available for the manufacture of paper, *papier-maché*, &c., whether used alone or in combination with other materials.

The stalks of the different species of the cotton-plant are all available for the above purpose, and are so claimed.

To enable others skilled in the art to make use of my discovery, I will proceed to describe how it is to be put into practice.

The stalks of the cotton-plant above may be used for paper-making, at any time after their maturity and the gathering of the crop of cotton, but by delaying the collection of the stalks till winter or spring, they will be drier and more readily broken up, bleached, &c.

The stalks of the cotton-plant are to be pulled up by the roots or cut off close to the ground, and left to dry in the sun for a few days.

The next step is to pass the stalks through the ordinary rope-cutter of the paper-mills, which will so cut and break the stalks as to fit them for being readily handled, and acted upon by chemicals or plain water during the boiling-process.

Where the stalks are large it may be necessary to crush them, by passing them through rollers before subjecting them to cutting.

After the stalks have been properly cut or crushed, they are to be boiled, in any ordinary boiler, from ten to twelve hours, at from sixty to eighty pounds' pressure per square inch, in water, lime-water, or limewater rendered caustic by carbonate of soda.

After boiling, the stalks are to be passed into the washing-engine, washed, beaten into half stuff, and bleached with chloride of lime, as usual.

The mass will then be ready for the finishing-engine, and, after a few hours' trituration, may be made into paper on the ordinary paper-machine.

I am aware that a process for making paper from the bark of the cotton-plant was patented by Mr. C. F. Sturgis, March 31, 1857, but this mode of making paper from the cotton-plant is disclaimed.

The mode of manufacture which I have proposed is essentially different, and is claimed as the only feasible process of rendering the cotton-plant available for paper-making.

What I claim as my discovery, and desire to secure by Letters Patent, is—

The applicability of the stalks of the different species of the cotton-plant, (*Gossypium*,) including the fibrous, the ligneous portion, and the pith of the entire plant, to the manufacture of paper, *papier-maché*, and its compounds, the whole to be crushed, boiled, and beaten together, and made into paper or paperpulp, substantially as herein described.

JOHN B. READ.

Witnesses:
EDM. F. BROWN,
C. BESTOR.